US012223928B1

(12) United States Patent
Barthomeuf et al.

(10) Patent No.: US 12,223,928 B1
(45) Date of Patent: Feb. 11, 2025

(54) DISPLAYS WITH PRIVACY CONTROL

(71) Applicant: Apple Inc., Cupertino, CA (US)

(72) Inventors: Olivier C. Barthomeuf, Santa Clara, CA (US); Christopher B. Lyons, Cupertino, CA (US); Joshua A. Spechler, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/234,851

(22) Filed: Aug. 16, 2023

Related U.S. Application Data

(60) Provisional application No. 63/408,784, filed on Sep. 21, 2022.

(51) Int. Cl.
*G09G 5/10* (2006.01)

(52) U.S. Cl.
CPC ....... *G09G 5/10* (2013.01); *G09G 2320/0626* (2013.01); *G09G 2354/00* (2013.01); *G09G 2358/00* (2013.01); *G09G 2360/144* (2013.01)

(58) Field of Classification Search
CPC ............... G09G 5/10; G09G 2360/144; G09G 2320/0626; G09G 2380/10; G09G 2358/00; G09G 2354/00
See application file for complete search history.

(56) References Cited

U.S. PATENT DOCUMENTS

| | | | | |
|---|---|---|---|---|
| 10,311,249 | B2 * | 6/2019 | Sharifi | G06F 21/35 |
| 2020/0332591 | A1 * | 10/2020 | Dierenbach | G09F 19/22 |
| 2022/0082873 | A1 * | 3/2022 | Matsubara | G02F 1/0121 |
| 2023/0260082 | A1 * | 8/2023 | Chase | G06T 7/70 382/284 |
| 2023/0297038 | A1 * | 9/2023 | Shrivastava | G05B 13/0265 700/267 |
| 2024/0118759 | A1 * | 4/2024 | Pirkkalaniemi | G06F 3/0412 |

* cited by examiner

*Primary Examiner* — Xuemei Zheng
(74) *Attorney, Agent, or Firm* — BAKERHOSTETLER

(57) ABSTRACT

Privacy control can be provided for displays that output content for users within an enclosed space. Display systems can include sensors that detect an external illuminance of an external environment outside the enclosed space. Based on the external illuminance and the brightness output by the display, the display system can control one or more of a variety of operating parameters to enhance privacy for the user within the enclosed space. For example, the display can be controlled with a reduced brightness when the external illuminance is low. By further example, windows separating the enclosed space from the external environment can be provided with an ability to adjust a transmissivity thereof and thereby reduce transmission of light from the display to the external environment. By further example, the display can be operated to change or omit certain content that has a relatively high privacy threshold.

16 Claims, 7 Drawing Sheets

DISPLAYS WITH PRIVACY CONTROL

CROSS-REFERENCE TO RELATED APPLICATION

This application claims the benefit of U.S. Provisional Application No. 63/408,784, entitled "DISPLAYS WITH PRIVACY CONTROL," filed Sep. 21, 2022, the entirety of which is incorporated herein by reference.

TECHNICAL FIELD

The present description relates generally to display for providing content, including, for example, displays with privacy control based on external illuminance.

BACKGROUND

Displays can be operated to output content, including visual media, on a graphical user interface. The user can interact with the display with user inputs to effect operations of a system that includes the display.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
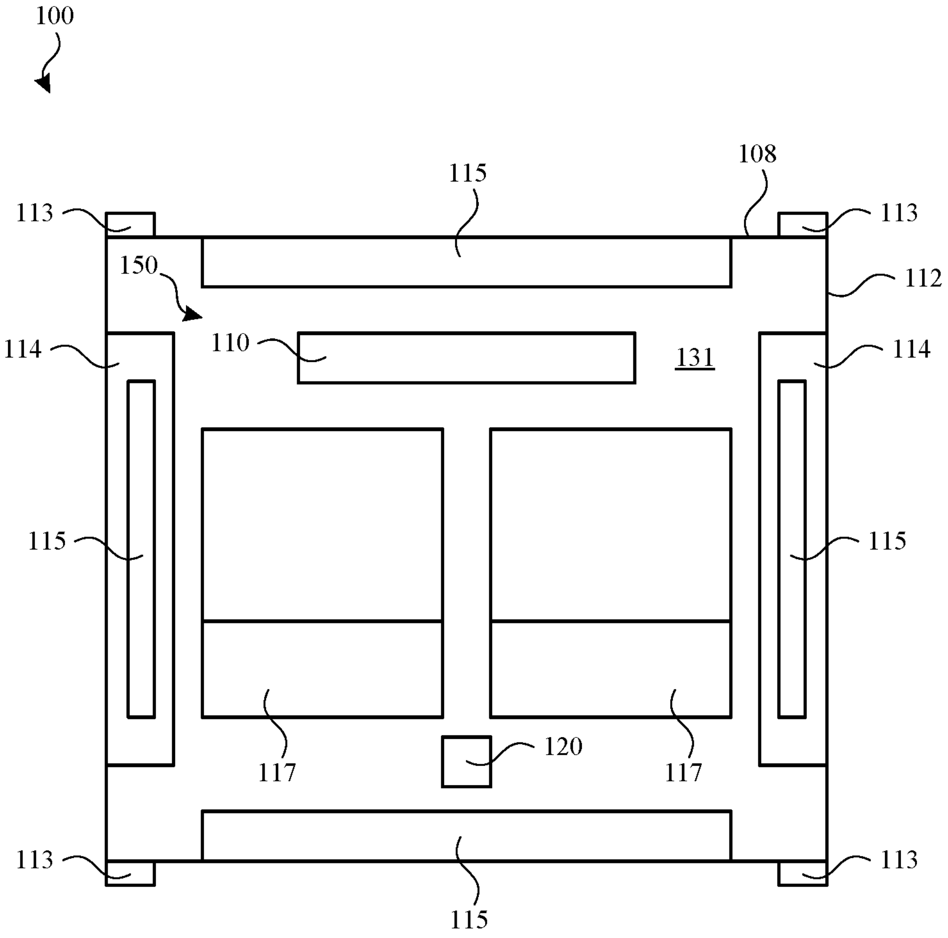
FIG. 1 illustrates a top view of an example apparatus in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Displays can be operated by a user to provide a variety of different types of visual content to the user, for example through a graphical user interface. The content output on the displays can include information intended for a particular user. The user can desire privacy while operating the display, such that information output thereon is viewed only by the particular user, and not by others. In an enclosed space, the user can have an expectation of privacy, particularly when the user is the only occupants within the enclosed space. However, some enclosed spaces can include windows, doors, or other media through which light can be transmitted. As such, individuals outside the enclosed space can capture a view of the display and be able to observe the information output thereon. As such, it can be desirable to ensure that only those within the enclosed space are able to observe the output provided by the display.

From outside an enclosed space, a person can be able to observe a display within the enclosed space if the light conditions are conducive to such an end. For example, when relatively little light is present in an external environment outside the enclosed space, the relative brightness of the display can allow the person outside the enclosed space to look into the enclosed space and observe an output from a display that is operating with a relatively high brightness. Such a result can be undesirable to the user within the enclosed space, particularly when the user is unaware that the content output by the display is being observed by another person.

Implementations of the subject technology described herein provide for privacy control on displays that output content for users within an enclosed space. Display systems can include sensors that detect an external illuminance of an external environment outside the enclosed space. Based on the external illuminance and the brightness output by the display, the display system can control one or more of a variety of operating parameters to enhance privacy for the user within the enclosed space. For example, the display can be controlled with a reduced brightness when the external illuminance is low. By further example, windows separating the enclosed space from the external environment can be provided with an ability to adjust a transmissivity thereof and thereby reduce transmission of light from the display to the external environment. By further example, the display can be operated to change or omit certain content that has a relatively high privacy threshold.

These and other implementations are discussed below with reference to FIGS. 1-9. However, those skilled in the art will readily appreciate that the detailed description given herein with respect to these Figures is for explanatory purposes only and should not be construed as limiting.

An illustrative apparatus, including a display system for outputting content, is shown in FIG. 1. In the example of FIG. 1, an apparatus 100 includes an enclosure 108. The enclosure 108 can (e.g., at least partially) define an enclosed space 131.

In this example, the enclosure 108 is depicted as a rectangular enclosure forming right angles. However, it will be understood that this arrangement is merely illustrative, and other arrangements are contemplated. For example, in one or more implementations, the enclosure 108 can be formed from a single (e.g., monolithic) structure having bends or curves between different portions thereof. In some implementations, at least some portions of enclosure 108 can be formed from one or more reflective surfaces 112 (e.g., surface that reflect electromagnetic radiation), one or more windows 115 (e.g., flat or curved glass structure), and/or one or more doors 114.

The apparatus 100 can include one or more seats 117 within the enclosure 108. The seats 117 can be or include support features for occupants within the enclosed space 131. Examples of seats 117 can further include benches and/or one or more other features for supporting and/or interfacing with one or more occupants. In some implementations, each seat 117 can have a seat back with a first side configured to interface with an occupant within the enclosure (e.g., when the occupant is seated on the seat 117 and resting their back against the seat back) and an opposing second side. Where multiple seats 117 are provided, the seats 170 can face in a same and/or different directions. One or more of the seats 117 can face in a direction towards a display 110.

The display 110 can be any device that outputs visual information for observation by another. Examples of display 110 can incorporate LEDs, OLEDs, a digital light projector, a laser scanning light source, liquid crystal on silicon, or any combination of these technologies. Examples of display 110 include heads-up displays, automotive windshields with the ability to display graphics, windows with the ability to display graphics, lenses with the ability to display graphics, tablets, smartphones, and desktop or laptop computers. In one or more implementations, display 110 can be operable in combination with another device, such as a portable electronic device, smartphone, a tablet device, a laptop computer, a smart watch, or another device within the enclosed space 131. It will be understood that the display 110 can optionally have a fixed position with respect to the enclosure 108 and within the enclosed space 131. In some implementations, display 110 can be movable within the enclosed space 131. For example, the display 110 can have an operable connection (e.g., wired or wireless) to other components of the apparatus 100.

The display 110 can be implemented using a housing that is sufficiently small to be portable and carried by a user. For example, the display 110 can be or be a portion of a laptop computer, a wearable device such as a smart watch, a pendant device, or other wearable or miniature device, a media player, a gaming device, a navigation device, or any other portable electronic device having a speaker and display. As such, the display 110 can be operably connected to components of the apparatus 100 to form a display system 150. In the display system 150, the display 110 can operate in concert with other components of the apparatus 100 while within the enclosed space 131.

The display 110 can be operated at a given brightness that is controlled based on the other parameters of the system and/or conditions and a proximity of the apparatus 100. For example, the brightness of the display 110 can be controlled based on external illuminance outside of the enclosure 108, the internal illuminance within the enclosure 108, the presence of occupants within the enclosure 108, the present persons outside the enclosure 108, and/or one or more other factors, as discussed further herein. The brightness of light output by the display 110 can be, for example, measured in nits (i.e., candelas per square meter or $cd/m^2$).

The enclosure 108 can include windows 115 separating the enclosed space 131 from the external environment outside the enclosed space 131. At least some of the windows 115 can be provided on doors 114 providing access between the enclosed space 131 and the external environment outside the enclosed space 131. In some implementations, the windows 115 can transmit light between the enclosed space 131 and the external environment. For example, light from the external environment can be visible from within the enclosed space 131 through the windows 115. By further example, light from within the enclosed space 131 can be visible from the external environment through the windows 115. Accordingly, light and content (e.g., displayed information) from the display 110 may be visible to others from the external environment depending on particular conditions, as described further herein.

In some implementations, the windows 115 can be provided with an ability to adjust a transmissivity thereof and/or otherwise change the transmission of light from the display 110 to the external environment. For example, the windows 115 can include an electrochromic device that can control optical properties such as optical transmission, absorption, reflectance and/or emittance in a continual but reversible manner on application of voltage. The electrochromic device can include two electrochromic layers separated by an electrolytic layer. The electrochromic device can be a solid-state device and/or a laminated device.

By further example, the windows 115 can include a polymer-dispersed liquid-crystal device, in which liquid crystals are dissolved or dispersed into a liquid polymer followed by solidification or curing of the polymer. With no applied voltage, the liquid crystals are randomly arranged in the droplets, resulting in scattering of light as it passes through the assembly. When a voltage is applied, the liquid crystals align, allowing light to pass through with very little scattering and resulting in a transparent state.

By further example, the windows 115 can include a suspended-particle device in which thin film laminate of rod-like nano-scale particles is suspended in a liquid and placed between two pieces of glass or plastic, or attached to one layer. When no voltage is applied, the suspended particles are randomly organized, thus blocking and absorbing light. When voltage is applied, the suspended particles align and let light pass there through.

By further example, the windows 115 can include microblinds or another opaque feature that is positioned to selectively block or transmit light as desired. Such microblinds can include rolled thin metal blinds on glass that react to applied voltage. When there is a potential difference between a rolled metal layer and a transparent conductive layer, the electric field formed between the two electrodes causes the rolled micro-blinds to stretch out and thus block light.

It will be understood that one or more other technologies and/or combinations thereof can be applied to provide the windows 115 with an ability to control transmissivity and/or tint of light there through.

The apparatus 100 can further include one or more sensors 113 for detecting one or more conditions with respect to the apparatus 100. In some implementations, one or more sensors 113 can detect a level of external illuminance outside the enclosed space 131 of the enclosure 108. For example, one or more sensors 113 can be positioned near or on an exterior of the enclosure 108 to detect external illuminance or other light conditions in an external environment outside of the enclosed space 131. Such a measurement can represent how a person outside of the enclosed space 131 (i.e., in the external environment) experiences ambient or other light. Illuminance can be measured in lux (lx) or lumens per square meter ($lm/m^2$).

Additionally or alternatively, the sensors 113 can be configured to detect a person, objection, or other presence outside the enclosed space 131 of the enclosure 108. The sensors 113 can include one or more image sensors, infrared sensors, depth sensors, thermal (e.g., infrared) sensors, radar sensors, UWB sensors, LIDAR sensors, time-of-flight sensors, and the like.

Additionally or alternatively, the sensors 113 can be configured to detect a person, objection, or other presence outside the enclosed space 131 of the enclosure 108. For example, the sensors 113 can include one or more image sensors, infrared sensors, depth sensors, thermal (e.g., infrared) sensors, radar sensors, UWB sensors, LIDAR sensors, time-of-flight sensors, and the like.

Additionally or alternatively, the sensors 113 can be configured to detect a position, orientation, speed, and/or acceleration of the apparatus 100. For example, the sensors 113 can include an inertial measurement unit ("IMU") that provides information regarding a characteristic of the apparatus 100, such as inertial angles thereof. By further example, the IMU can include a six-degrees of freedom IMU that calculates the apparatus's position, velocity, and/or acceleration based on six degrees of freedom (x, y, z, $\theta_x$, $\theta_y$, and $\theta_z$). The IMU can include one or more of an accelerometer, a gyroscope, and/or a magnetometer. Additionally or alternatively, the sensors 113 can detect motion characteristics of the apparatus 100 with one or more other motion sensors, such as an accelerometer, a speedometer, a gyroscope, a global positioning sensor (e.g., satellite-based positioning components), a tilt sensor, and so on for detecting movement and acceleration of the apparatus 100.

The apparatus 100 can further include one or more light emitters 120 within the enclosed space 131 of the enclosure 108. The light emitter 120 can provide light within the enclosed space 131 to allow an occupant within the enclosed space 131 see objects therein. The output of the light emitter 120 can be controlled to enable a user to see out into the external environment as desired and provide balance light to maintain visibility of the display 110 as desired. Controls of the output provided by the light emitter 120 can be manual or automated, as described further herein.

In various implementations, the apparatus 100 can be implemented as a stationary apparatus (e.g., a conference room or other room within a building) or a movable apparatus (e.g., a vehicle such as an autonomous vehicle, a train car, an airplane, a boat, a ship, a helicopter, etc.) that can be temporarily occupied by one or more human occupants. In one or more implementations, the apparatus 100 can include one or more seats 117 for the one or more occupants. In one or more implementations, one or more of the seats can be mounted facing in the same direction as one or more other seats, and/or in a different (e.g., opposite) direction of one or more other seats.

In various implementations, the apparatus 100 can include one or more other structural, mechanical, electronic, and/or computing components and/or circuitry that are not shown in FIG. 1. For example, FIG. 2 illustrates a schematic diagram of the apparatus 100 in accordance with one or more implementations.

Figure 2:
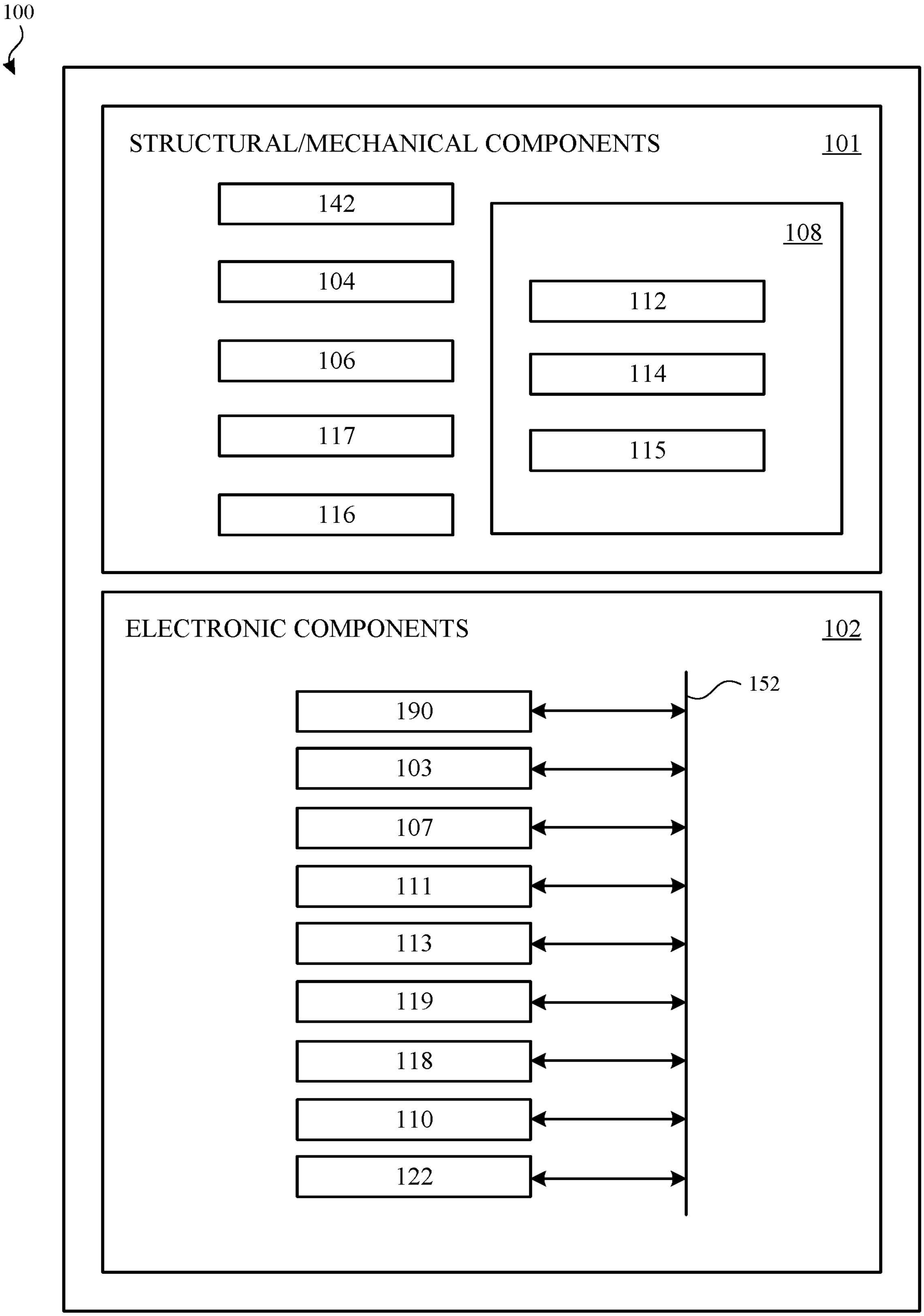
FIG. 2 illustrates a block diagram of the example apparatus of FIG. 1 in accordance with one or more implementations.

As shown in FIG. 2, the apparatus 100 can include structural and/or mechanical components 101 and electronic components 102. In this example, the structural and/or mechanical components 101 include the enclosure 108, the support structure 104, and the safety component 116 of FIG. 1. In this example, the structural and/or mechanical components 101 also include a platform 142, propulsion components 106, and seats 117. In this example, the enclosure 108 includes a reflective surface 112, an access feature (e.g., door 114), and one or more windows 115.

As examples, the safety components 116 can include one or more seatbelts, one or more airbags, a roll cage, one or more fire-suppression components, one or more reinforcement structures, or the like. As examples, the platform 142 can include a floor, a portion of the ground, or a chassis of a vehicle. As examples, the propulsion components can include one or more drive system components such as an engine, a motor, and/or one or more coupled wheels, gearboxes, transmissions, or the like. The propulsion components can also include one or more power sources such as fuel tank and/or a battery. As examples, the seats 117 can be support features for occupants within the enclosed space 131 of FIG. 1, such as one or more seats, benches, and/or one or more other features for supporting and/or interfacing with one or more occupants. As examples, the reflective surface 112 can be a portion of a top housing structure or a sidewall housing structure, such as a wall or frame. As examples, the access feature can be a door 114 or other feature for selectively allowing occupants to enter and/or exit the enclosed space 131 of FIG. 1.

As illustrated in FIG. 2, the electronic components 102 can include various components, such as a processor 190, wireless transceiver 103 (e.g., WiFi, Bluetooth, near field communications (NFC) or other RF communications circuitry), memory 107, a camera 111 (e.g., an optical wavelength camera and/or an infrared camera, which can be implemented in the other components 132 of FIG. 1), sensors 113 (e.g., illuminance sensor, camera, inertial sensor, such as one or more accelerometers, one or more gyroscopes, and/or one or more magnetometers, one or more mapping sensors such as radar sensors, UWB sensors, LIDAR sensors, depth sensors, and/or time-of-flight sensors, temperature sensors, humidity sensors, etc.), one or more microphones such as microphone 119, one or more speakers 118, a display 110, and a touch-sensitive surface 122. These components optionally communicate over a communication bus 152. Although a single processor 190, wireless transceiver 103, memory 107, camera 111, sensor 113, microphone 119, speaker 118, display 110, and touch-sensitive surface 122 are shown in FIG. 2, it is appreciated that the electronic components 102 can include one, two, three, or generally any number of processors 190, wireless transceiver 103, memories 107, cameras 111, sensors 113, microphones 119, speakers 118, displays 110, and/or touch-sensitive surfaces 122.

In the example of FIG. 2, apparatus 100 includes a processor 190 and memory 107. Processor 190 can include one or more general processors, one or more graphics processors, and/or one or more digital signal processors. In some examples, memory 107 can include one or more non-transitory computer-readable storage mediums (e.g., flash memory, random access memory, volatile memory, non-volatile memory, etc.) that store computer-readable instructions configured to be executed by processor 190 to perform the techniques described below.

Touch-sensitive surface 122 can be configured for receiving user inputs, such as tap inputs and swipe inputs. In some examples, display 110 and touch-sensitive surface 122 form a touch-sensitive display.

Camera 111 optionally includes one or more visible light image sensors, such as charged coupled device (CCD) sensors, and/or complementary metal-oxide-semiconductor (CMOS) sensors operable to obtain images within the enclosed space 131 and/or of an environment external to the enclosure 108. Camera 111 can also optionally include one or more infrared (IR) sensor(s), such as a passive IR sensor or an active IR sensor, for detecting infrared light from within the enclosed space 131 and/or of an environment external to the enclosure 108. For example, an active IR sensor includes an IR emitter, for emitting infrared light. Camera 111 also optionally includes one or more event camera(s) configured to capture movement of objects such as portable electronic devices and/or occupants within the enclosed space 131 and/or objects such as vehicles, roadside objects and/or pedestrians outside the enclosure 108. Camera 111 also optionally includes one or more depth sensor(s) configured to detect the distance of physical elements from the enclosure 108 and/or from other objects within the enclosed space 131 and/or outside the enclosed space 131. In some examples, camera 111 includes CCD sensors, event cameras, and depth sensors that are operable in combination to detect the physical setting around apparatus 100. The camera 111 can be or include one of the sensors 113.

Figure 3:
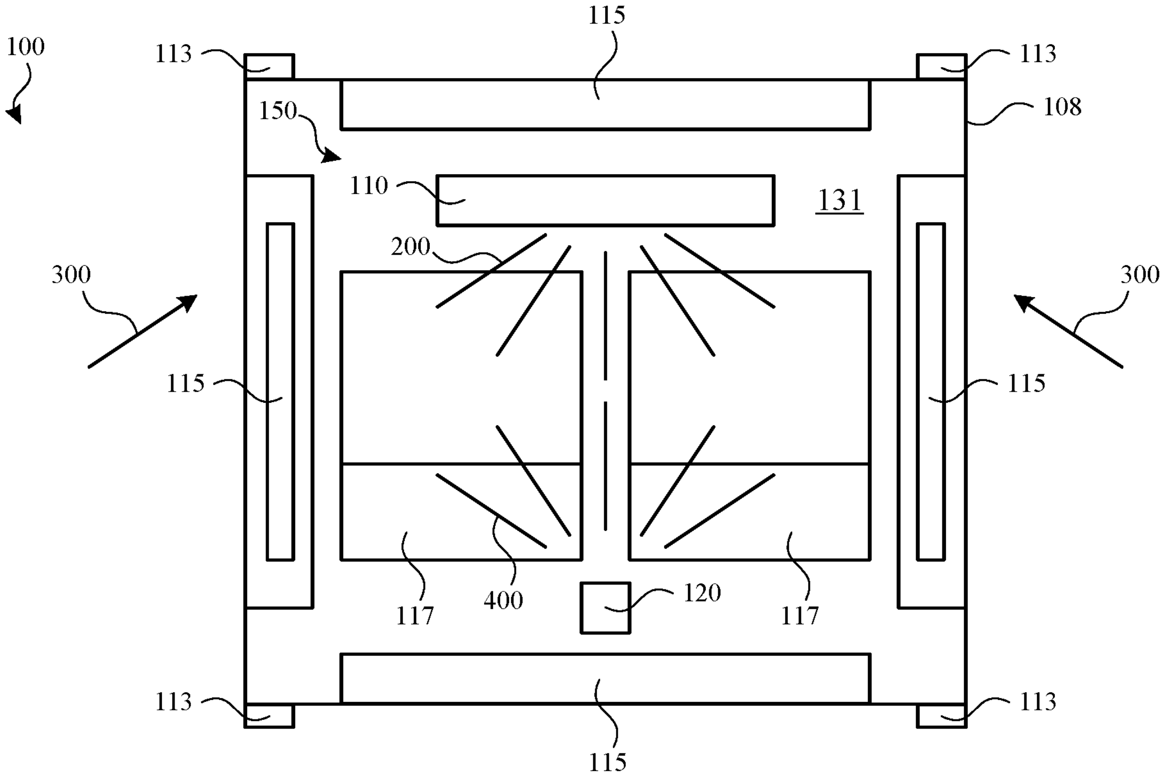
FIG. 3 illustrates a top view of an example apparatus with first display output in accordance with one or more implementations.

FIG. 3 illustrates a top view of an example implementation of the apparatus 100 in which a display 110 and/or windows 115 is operated based on detected conditions in and/or around the apparatus 100.

As shown in FIG. 3, the display 110 can be operated to provide an output at a particular brightness 200 based on one or more detected conditions. In some implementations, the brightness of the display 110 can be selected so that:

$$\frac{B_d \times T_{win}}{I_e} < t$$

where $B_d$ is the brightness of the display 110 (in nits), $T_{win}$ is the transmissivity of the window 115 in the visible portion of the spectrum (in %), $I_e$ is the external illuminance outside the enclosure 108 (in lux), and t is a constant (nits/lux) selected based on factors described further herein. It will be recognized that the brightness of the display 110 ($B_d$), the transmissivity of the window 115 ($T_{win}$), and/or the constant (t) can be controlled by a display system 150 to satisfy the above relationship. In particular, the brightness of the display 110 ($B_d$) and/or the transmissivity of the window 115 ($T_{win}$) can be controlled by changing operating parameters of the display system 150.

The constant (t) can be selected based on a privacy threshold of content output by the display 110. For example, content to be output by the display 110 can have a corresponding privacy threshold that is to be satisfied based on the above relationship. It will be understood that some content may be more sensitive than others and that there can be a greater desire to maintain some types of content as private from unintended observers. For example, some content may include personal information, proprietary information, private correspondence, and the like. It can be desirable to ensure that such content is not output by the display 110 in a manner that is visible to others, such as persons outside the enclosure 108. By further example, some content may include publicly available content, such as news articles, movies, broadcasts, and the like. It can be acceptable that such content is output by the display 110 in a manner that is visible to others, such as persons outside the enclosure 108. As such, each item of content can have a privacy threshold that determines whether it is desirable to maintain it as private or acceptable to allow it to be observed by others. A privacy threshold can be automatically determined based on a characteristic of the content, such as the type of content, the author of the content, the source of the content, and the like. A privacy threshold can be manually set based on a user input indicating the level of privacy desired. The constant (t) can be selected based on the determined or set privacy threshold, and the other terms of the above relationship can be detected and/or selected to satisfy the privacy threshold represented by the constant (t).

In some implementations, the privacy threshold represented by the constant (t) can be selected based on detected conditions.

In some implementations, the privacy threshold can be relatively high, i.e., to provide greater privacy, when a person is detected in the external environment outside the enclosure 108. By further example, the privacy threshold can be relatively low when no person is detected in the external environment outside the enclosure 108.

In some implementations, the privacy threshold can be relatively high when a movement speed of the apparatus 100 is detected to be relatively low. By further example, the privacy threshold can be relatively low when a movement speed of the apparatus 100 is detected to be relatively high (e.g., when a person would have difficulty approaching the apparatus 100).

In some implementations, the privacy threshold can be relatively high when a location of the apparatus 100 is detected to be in a location known or predicted to be relatively populated (e.g., populated city). By further example, the privacy threshold can be relatively low when a location of the apparatus 100 is detected to be in a location known or predicted to be relatively unpopulated (e.g., unpopulated countryside).

The external illuminance 300 can be detected by the one or more sensors 113. The external illuminance 300 can represent an amount of light (e.g., ambient light) experienced in the external environment, for example by a user outside of the enclosure 108. It can be desirable to maintain content output by the display 110 as private to occupants within the enclosure 108. As such, the visibility of the display 110 to a person outside of the enclosure 108 can depend at least in part on the external illuminance 300. Where the external illuminance 300 is relatively high, it can be relatively difficult for a person outside of the enclosure 108 to view the display 110 and the content output thereby. As such, a high external illuminance 300 can be detected, and the display 110 can be operated at a relatively higher brightness 200. Additionally or alternatively, the windows 115 can be maintained at a relatively higher transmissivity. Despite such operating parameters and due to the high external illuminance 300, a person outside the enclosure 108 may be unable to view the output of the display 110.

In some implementations, the brightness 400 of the light emitter 120 can be operated based on similar factors. For example, the light emitter 120 can be operated at a higher brightness 400 when the brightness 200 of the display 110 is higher. While the brightness 400 of the light emitter 120 may not change the visibility of the display 110 to a person outside of the enclosure 108, it can be controlled to be balanced with the brightness 200 of the display 110. As such, the brightness 400 of the light emitter 120 can provide desired light to the occupants within the enclosure 108.

Figure 4:
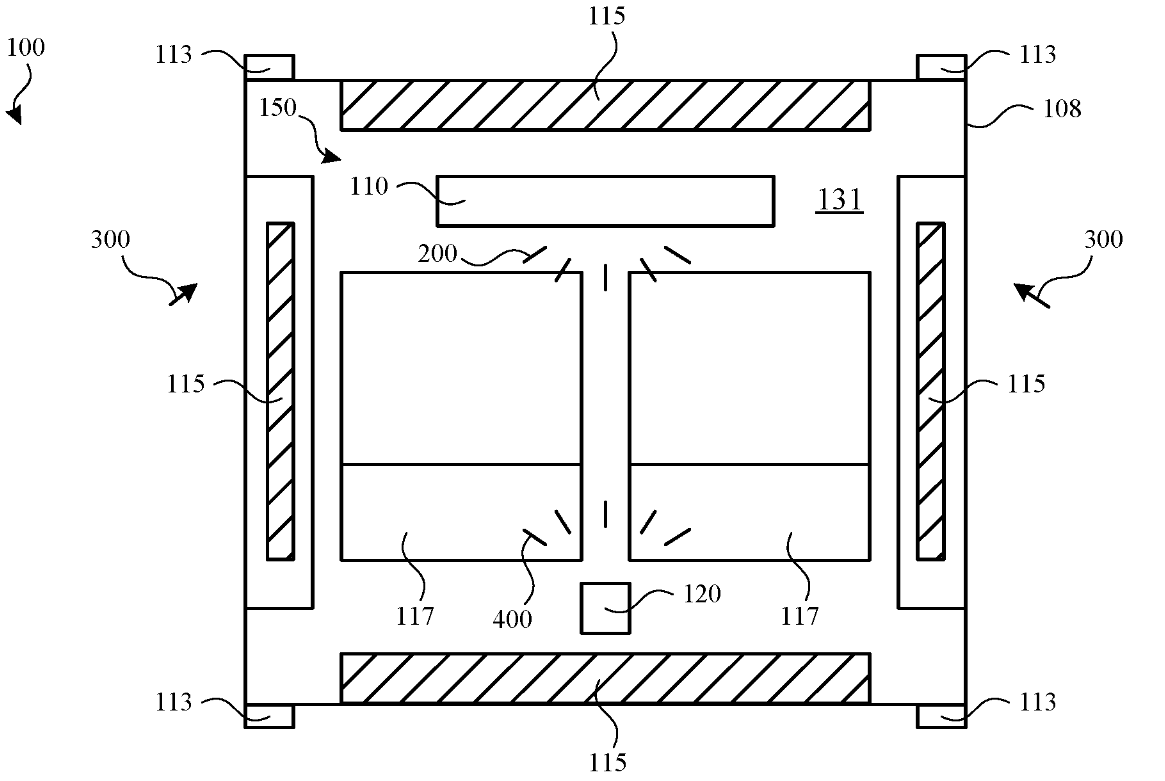
FIG. 4 illustrates a top view of the example apparatus of FIG. 3 with second display output in accordance with one or more implementations.

FIG. 4 illustrates another top view of an example implementation of the apparatus 100 in which a display 110 and/or windows 115 is operated based on detected conditions in and/or around the apparatus 100.

Where the external illuminance 300 is relatively low, it can be relatively easy for a person outside of the enclosure 108 to view the display 110 and the content output thereby unless adjustments are made to address the relative contrast. In some implementations, when a high external illuminance 300 can be detected, the display 110 can be operated at a relatively lower brightness 200. Additionally or alternatively, the windows 115 can be maintained at a relatively lower transmissivity. Despite the low external illuminance 300 and due to such operating parameters, a person outside the enclosure 108 may be unable to view the output of the display 110.

In some implementations, the brightness 400 of the light emitter 120 can be operated based on similar factors. For example, the light emitter 120 can be operated at a lower brightness 400 when the brightness 200 of the display 110 is lower. While the brightness 400 of the light emitter 120 may not change the visibility of the display 110 to a person outside of the enclosure 108, it can be controlled to be balanced with the brightness 200 of the display 110. For example, the brightness 400 of the light emitter 120 may be reduced so that the relatively low brightness 200 of the display 110 is adequate for occupants within the enclosure 108.

Figure 5:
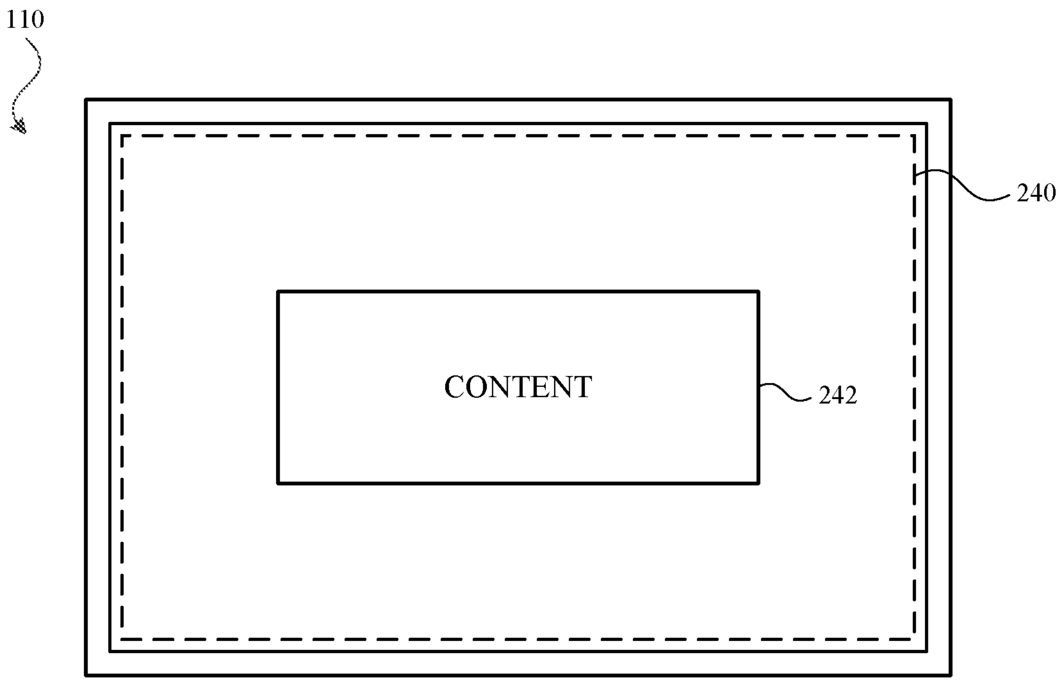
FIG. 5 illustrates a view of a display providing the user interface with content, according to some implementations of the present disclosure.
Figure 6:
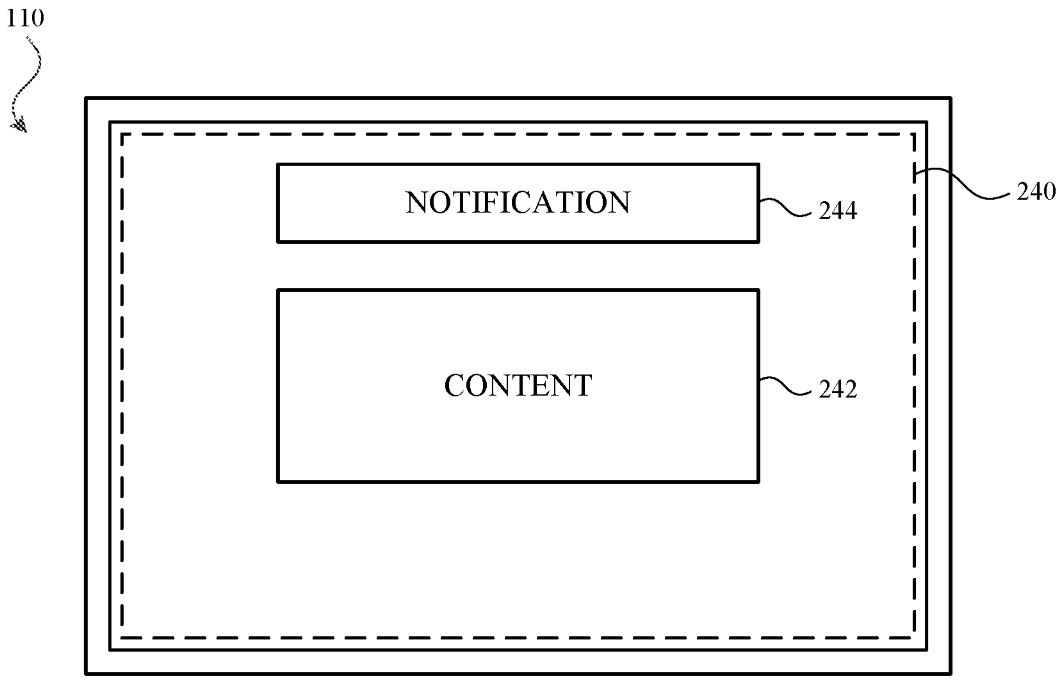
FIG. 6 illustrates a view of a display providing the user interface with content and a notification, according to some implementations of the present disclosure.
Figure 7:
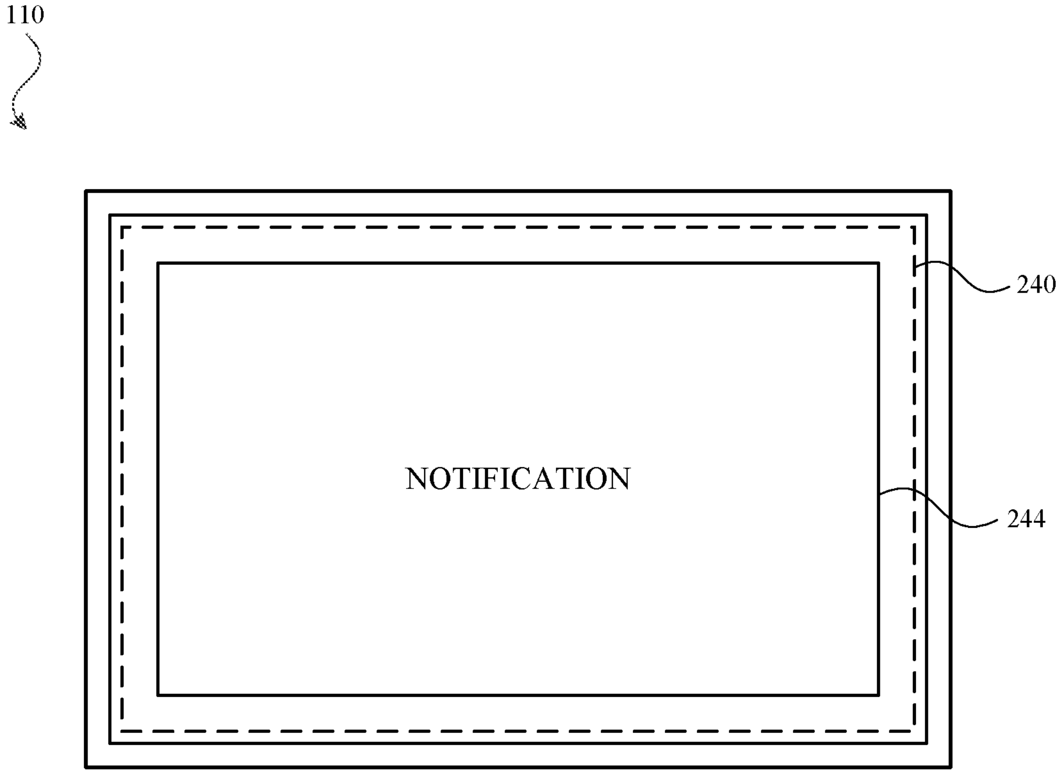
FIG. 7 illustrates a view of a display providing the user interface with a notification, according to some implementations of the present disclosure.

FIGS. 5-7 illustrate a view of a display of a display system providing a user interface, according to some implementations of the present disclosure. For this or any user interface depicted or described herein, not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

As shown in FIG. 5, the display system can include one or more output devices, such as the display 110, for outputting information to the user. The display 110 can provide a user interface 240 that outputs the content 242 as visual information. Such content 242 can include media, photos, videos, documents, notifications, messages, text, images, display features, websites, app features, and the like. It will be understood that such content can be displayed visually and/or otherwise output as sound, and the like.

As shown in FIG. 6, the display 110 can provide a notification 244 to a user to alert the user regarding whether a privacy threshold is satisfied. For example, where a privacy threshold is reduced due to detected conditions and/or an introduction of new (e.g., sensitive) content, the display system can determine whether the brightness of the display, the external illuminance, and/or the windows transmissivity satisfies the privacy threshold. When the privacy threshold is not satisfied, the user can be alerted with the notification 244. As shown in FIG. 6, the content 242 can optionally be maintained on the user interface 240 of the display 110 while the notification 244 is output.

As shown in FIG. 7, the display 110 can omit the content and/or provide a notification 244 to a user. For example, where a privacy threshold is reduced, as described herein, the display system can determine that the content cannot be displayed without an undesirable risk of visibility to others. When the privacy threshold is not satisfied, the user can be alerted with the notification 244. As shown in FIG. 7, the content can be removed and/or omitted.

In some implementations, the content can be maintained but in an altered state to reduce visibility to others. For example, the content can be blurred, darkened (e.g., without changing the overall brightness of the display 110), blocked, pixelated, and the like. Such alterations can be made while the privacy threshold is not satisfied and/or until the privacy threshold is satisfied.

Figure 8:
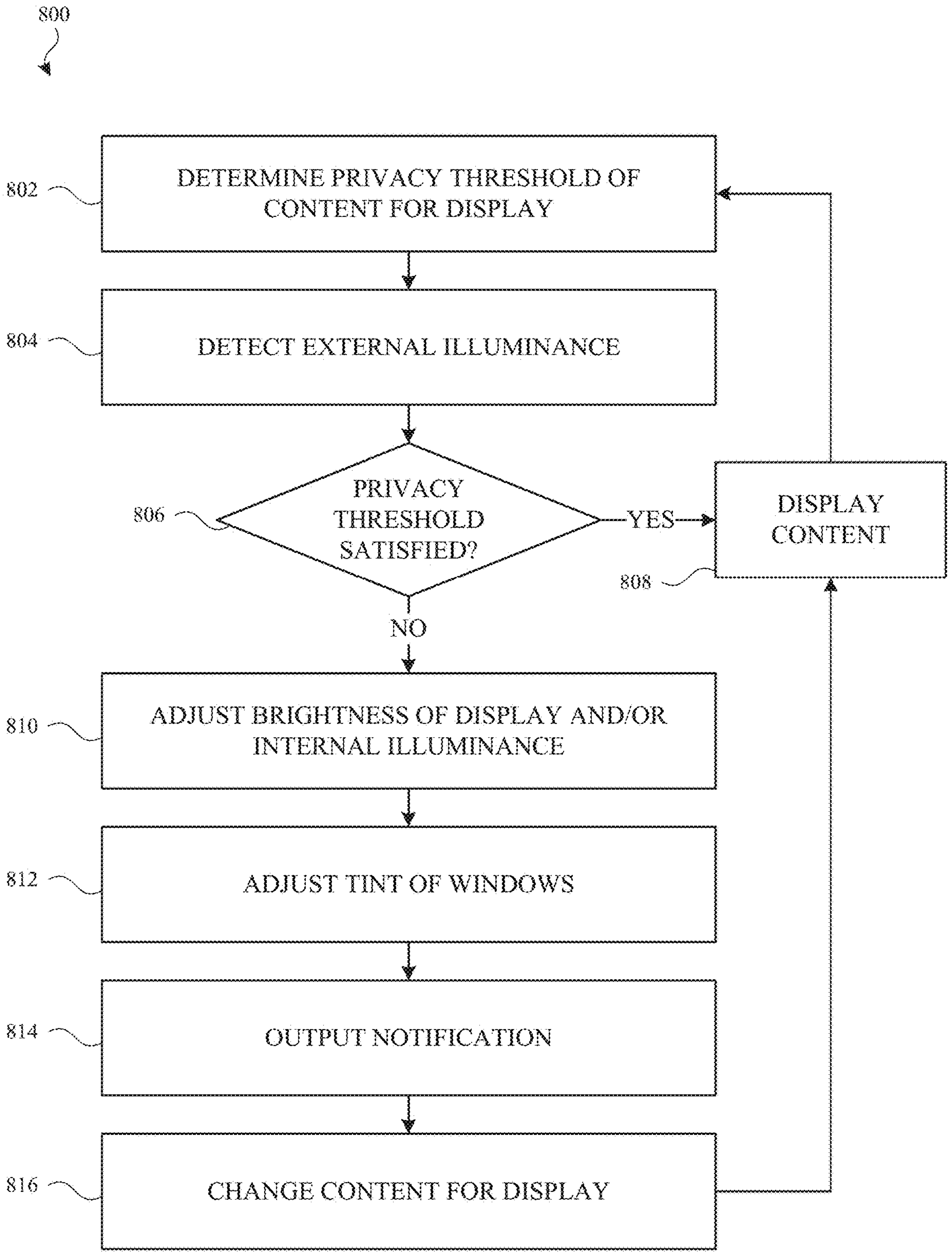
FIG. 8 illustrates a flow chart of example operations that can be performed by an output system in accordance with implementations of the subject technology.

FIG. 8 illustrates a flow diagram of an example process 800 for providing spatial modeling of enclosed environments for charging a portable electronic device, in accordance with implementations of the subject technology. For explanatory purposes, the process 800 is primarily described herein with reference to the apparatus 100 (e.g., display system 150) and the display 110 thereof as shown in FIGS. 1-7. However, the process 800 is not limited to the apparatus 100 (e.g., display system 150) and the display 110 of FIGS. 1-7, and one or more blocks (or operations) of the process 800 can be performed by one or more other components of other suitable devices or systems. Further for explanatory purposes, some of the blocks of the process 800 are described herein as occurring in serial, or linearly. However, multiple blocks of the process 800 can occur in parallel. In addition, the blocks of the process 800 need not be performed in the order shown and/or one or more blocks of the process 800 need not be performed and/or can be replaced by other operations.

At block 802, a privacy threshold of content can be determined. The content can be presently displayed or for display in a subsequent operation. The privacy threshold can be based on a variety of factors, as described herein. For example, the determination of the privacy threshold can be based on the content itself and/or one or more detected conditions.

At block 804, an external illuminance of an external environment can be detected. The external illuminance can be determined with one or more sensors of an apparatus. Additionally, a brightness of a display and/or a transmissivity of a window can be determined based on controlled operations thereof.

At block 806, the display system can determine whether the privacy threshold has been satisfied. Such a determination can be based on the privacy threshold, the detected external illuminance, the controlled or otherwise determined brightness of the display, and/or the controlled or otherwise determined transmissivity of a window.

At block 808, if the privacy threshold has been satisfied, the content can be displayed and process 800 can return to block 802.

At block 810, the brightness of the display can be adjusted to satisfy the privacy threshold. In particular, the brightness of the display can be decreased until the privacy threshold is satisfied. Optionally, the internal illuminance of a light emitter within the enclosure can be adjusted. While the adjustment of internal illuminance may not directly affect the satisfaction of a privacy threshold, such internal light can be used to be balanced against the brightness of the display.

At block 812, the transmissivity of a window can be adjusted to satisfy the privacy threshold. In particular, the transmissivity of the window can be decreased until the privacy threshold is satisfied.

At block 814, one or more notifications can be output by the display. Such a notification can include an indication of whether the privacy threshold is satisfied. The user can provide one or more manual adjustments to satisfy the privacy threshold. Additionally or alternatively, the user can provide one or more manual overrides to cause output of the content regardless of satisfaction of a privacy threshold.

At block 816, the content for display can be changed. For example, the display can be changed to omit the content, blur the content, block the content, and the like.

It will be understood that any one or more of the operations represented by blocks 810, 812, 814, and/or 816 can be performed. Not all operations need be performed. Following any number of such operations, the content can be displayed at block 808 and process 800 can return to block 802. Where the content is changed (e.g., at block 816), the content displayed at block 808 can incorporate such change(s).

Figure 9:
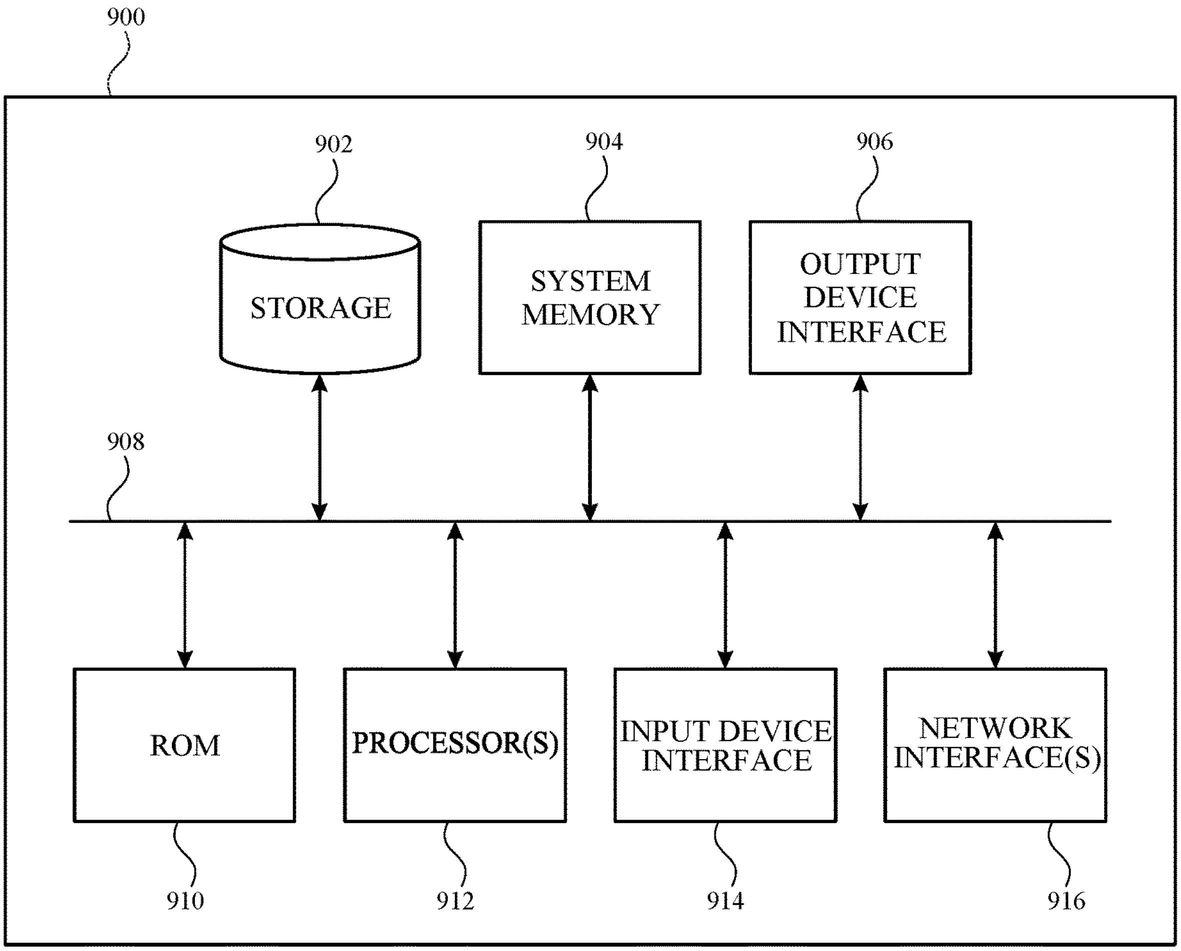
FIG. 9 illustrates an example electronic system with which aspects of the subject technology can be implemented in accordance with one or more implementations.

FIG. 9 illustrates an electronic system 900 with which one or more implementations of the subject technology can be implemented. The electronic system 900 can be, and/or can be a part of, the display system 150 and/or display 110 shown in FIGS. 1-7. The electronic system 900 can be, and/or can be a part of, the apparatus 100 shown in FIGS. 1-4. The electronic system 900 can include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, can be a read-and-write memory device. The permanent storage device 902 can be a non-volatile memory unit that stores instructions and data even when the electronic system 900 is off. In one or more implementations, a mass-storage device (such as a magnetic or optical disk and its corresponding disk drive) can be used as the permanent storage device 902.

In one or more implementations, a removable storage device (such as a floppy disk, flash drive, and its corresponding disk drive) can be used as the permanent storage device 902. Like the permanent storage device 902, the system memory 904 can be a read-and-write memory device. However, unlike the permanent storage device 902, the system memory 904 can be a volatile read-and-write memory, such as random access memory. The system memory 904 can store any of the instructions and data that one or more processing unit(s) 912 can need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that can be used with the input device interface 914 can include, for example, alphanumeric keyboards and pointing devices (also called "cursor control devices"). The output device interface 906 can enable, for example, the display of images generated by electronic system 900. Output devices that can be used with the output device interface 906 can include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations can include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Various processes defined herein consider the option of obtaining and utilizing a user's personal information. For example, such personal information can be utilized for spatial modeling of enclosed environments for control of acoustic components. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties can access or otherwise obtain personal information. For instance, settings or other preferences can be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

Accordingly, privacy control can be provided to displays that output content for users within an enclosed space. Display systems can include sensors that detect an external illuminance of an external environment outside the enclosed space. Based on the external illuminance and the brightness output by the display, the display system can control one or more of a variety of operating parameters to enhance privacy for the user within the enclosed space. For example, the display can be controlled with a reduced brightness when the external illuminance is low. By further example, windows separating the enclosed space from the external environment can be provided with an ability to adjust a transmissivity thereof and thereby reduce transmission of light from the display to the external environment. By further example, the display can be operated to change or omit certain content that has a relatively high privacy threshold.

Various examples of aspects of the disclosure are described below as clauses for convenience. These are provided as examples, and do not limit the subject technology.

Clause A: a display system for an enclosed space, the display system comprising: a sensor configured to detect a level of an external illuminance outside the enclosed space; and a display disposed inside the enclosed space and configured to output content having a privacy threshold, the display being configured to adjust a display brightness of the display based on the level of the external illuminance outside the enclosed space and until the privacy threshold is satisfied.

Clause B: a display system for an enclosed space, the display system comprising: a sensor configured to detect a level of an external illuminance in an external environment outside the enclosed space; a display inside the enclosed space and configured to provide an output at a brightness; and a window separating the enclosed space from the external environment, the window having an adjustable transmissivity for controlling an amount of light transmitted through the window, wherein the window is configured to adjust the transmissivity based on the level of the external illuminance in the external environment and the brightness of the display.

Clause C: a display system for an enclosed space, the display system comprising: a sensor configured to detect a level of an external illuminance outside the enclosed space; and a display disposed inside the enclosed space, the display being configured to: output content at a brightness, the content having a privacy threshold; determine whether the privacy threshold is satisfied based on the level of the external illuminance and the brightness of the display; and if the privacy threshold is not satisfied, change the content on the display.

One or more of the above clauses can include one or more of the features described below. It is noted that any of the following clauses can be combined in any combination with each other, and placed into a respective independent clause, e.g., clause A, B, or C.

Clause 1: a light emitter within the enclosed space, the light emitter being configured to adjust an emitter brightness based on the display brightness.

Clause 2: the display comprises a touch-sensitive surface.

Clause 3: a window separating the enclosed space from an external environment outside the enclosed space, the window having an adjustable transmissivity for controlling an amount of light transmitted through the window, wherein the window is configured to adjust the transmissivity based on the level of the external illuminance and the display brightness.

Clause 4: the privacy threshold is based on a characteristic of the content.

Clause 5: the display is further configured to: determine whether the privacy threshold is satisfied based on the level of the external illuminance and the display brightness of the display; and if the privacy threshold is not satisfied, change the content on the display.

Clause 6: an additional sensor configured to determine a location of the enclosed space, wherein the privacy threshold is determined based on the location.

Clause 7: an additional sensor configured to detect a presence outside the enclosed space, wherein the privacy threshold is determined based on a detection of the presence.

Clause 8: the enclosed space is part of a movable platform, wherein the privacy threshold is determined based on a speed of the movable platform.

Clause 9: the display is configured to change the content by removing at least some of the content.

Clause 10: the display is configured to change the content by outputting a notification corresponding to the privacy threshold.

Clause 11: the window is one or multiple windows separating the enclosed space from the external environment, each of the windows having an adjustable transmissivity.

Clause 12: the window is selected from the group consisting of: an electrochromic device, a polymer-dispersed liquid-crystal device, a suspended-particle device, and microblinds.

Clause 13: the output comprises content having a privacy threshold, the privacy threshold being based on a characteristic of the content.

Clause 14: the display is further configured to: determine whether the privacy threshold is satisfied based on the level of the external illuminance, the brightness of the display, and the transmissivity of the window; and if the privacy threshold is not satisfied, change the output of the display.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes can be rearranged, or that all illustrated blocks be performed. Any of the blocks can be performed simultaneously. In one or more implementations, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component can also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an implementation, the implementation, another implementation, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) can apply to all configurations, or one or more configurations. A disclosure relating to such phrase(s) can provide one or more examples. A phrase such as an aspect or some aspects can refer to one or more aspects and vice versa, and this applies similarly to other foregoing phrases.

The word "exemplary" is used herein to mean "serving as an example, instance, or illustration". Any implementation described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neutral gender (e.g., her and its) and vice versa. Headings and subheadings, if any, are used for convenience only and do not limit the subject disclosure.

What is claimed is:

1. A display system for an enclosed space, the display system comprising:

a sensor configured to detect a level of an external illuminance outside the enclosed space; and a display disposed inside the enclosed space and configured to output content having a privacy threshold, the display being configured to adjust a display brightness of the display based on the level of the external illuminance outside the enclosed space and until the privacy threshold is satisfied, wherein the privacy threshold is based on a characteristic of the content and wherein the display is further configured to:

determine whether the privacy threshold is satisfied based on the level of the external illuminance and the display brightness of the display; and if the privacy threshold is not satisfied, change the content on the display.

2. The display system of claim 1, further comprising a light emitter within the enclosed space, the light emitter being configured to adjust an emitter brightness based on the display brightness.

3. The display system of claim 1, wherein the display comprises a touch-sensitive surface.

4. The display system of claim 1, further comprising a window separating the enclosed space from an external environment outside the enclosed space, the window having an adjustable transmissivity for controlling an amount of light transmitted through the window, wherein the window is configured to adjust the transmissivity based on the level of the external illuminance and the display brightness.

5. The display system of claim 1, further comprising an additional sensor configured to determine a location of the enclosed space, wherein the privacy threshold is determined based on the location.

6. The display system of claim 1, further comprising an additional sensor configured to detect a presence outside the enclosed space, wherein the privacy threshold is determined based on a detection of the presence.

7. The display system of claim 1, wherein the enclosed space is part of a movable platform, wherein the privacy threshold is determined based on a speed of the movable platform.

8. A display system for an enclosed space, the display system comprising:

a sensor configured to detect a level of an external illuminance in an external environment outside the enclosed space;

a display inside the enclosed space and configured to provide an output at a brightness; and a window separating the enclosed space from the external environment, the window having an adjustable transmissivity for controlling an amount of light transmitted through the window, wherein the window is configured to adjust the transmissivity based on the level of the external illuminance in the external environment and the brightness of the display, wherein the output comprises content having a privacy threshold, the privacy threshold being based on a characteristic of the content and wherein the display is further configured to:

determine whether the privacy threshold is satisfied based on the level of the external illuminance, the brightness of the display, and the transmissivity of the window; and if the privacy threshold is not satisfied, change the output of the display.

9. The display system of claim 8, wherein the window is one or multiple windows separating the enclosed space from the external environment, each of the windows having an adjustable transmissivity.

10. The display system of claim 8, wherein the window is selected from the group consisting of: an electrochromic device, a polymer-dispersed liquid-crystal device, a suspended-particle device, and microblinds.

11. A display system for an enclosed space, the display system comprising:

a sensor configured to detect a level of an external illuminance outside the enclosed space; and a display disposed inside the enclosed space, the display being configured to:

output content at a brightness, the content having a privacy threshold;

determine whether the privacy threshold is satisfied based on the level of the external illuminance and the brightness of the display; and if the privacy threshold is not satisfied, change the content on the display.

12. The display system of claim 11, wherein the display is configured to change the content by removing at least some of the content.

13. The display system of claim 11, wherein the display is configured to change the content by outputting a notification corresponding to the privacy threshold.

14. The display system of claim 11, further comprising an additional sensor configured to determine a location of the enclosed space, wherein the privacy threshold is determined based on the location.

15. The display system of claim 11, further comprising an additional sensor configured to detect a presence outside the enclosed space, wherein the privacy threshold is determined based on a detection of the presence.

16. The display system of claim 11, wherein the enclosed space is part of a movable platform, wherein the privacy threshold is determined based on a speed of the movable platform.

* * * * *